US012313398B2

(12) United States Patent
Ji et al.

(10) Patent No.: US 12,313,398 B2
(45) Date of Patent: May 27, 2025

(54) THREE-DIMENSIONAL OBJECT SCANNING DEVICE AND METHOD

(71) Applicant: Tencent America LLC, Palo Alto, CA (US)

(72) Inventors: Yu Ji, Baton Rouge, LA (US); Changxi Zheng, Palo Alto, CA (US); Xinyuan Li, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 244 days.

(21) Appl. No.: 17/975,279

(22) Filed: Oct. 27, 2022

(65) Prior Publication Data
US 2024/0142225 A1    May 2, 2024

(51) Int. Cl.
*G01B 11/25* (2006.01)
*G09F 9/30* (2006.01)

(52) U.S. Cl.
CPC ............ *G01B 11/2518* (2013.01); *G09F 9/30* (2013.01)

(58) Field of Classification Search
CPC . G01B 11/2513; G01B 11/2545; G01B 11/25; G01B 11/2518; G01B 11/2433; G01B 11/245; G01B 11/254; G01B 11/2527; G01B 11/2509; G01B 11/00; G01B 11/24; G01B 11/005; G01B 11/03; G01B 11/002; G01B 11/2536; G01B 11/02; G01B 11/022; G01B 11/27; G01B 5/012; G01B 11/22; G01B 21/047; G01B 21/20;
(Continued)

(56) References Cited

U.S. PATENT DOCUMENTS

| 6,771,307 B2 * | 8/2004 | Waki .................... H04N 9/3147 |
| | | 348/189 |
| 9,417,185 B1 * | 8/2016 | Bruce .................... G01N 21/55 |

(Continued)

FOREIGN PATENT DOCUMENTS

| CN | 110634179 A | * | 12/2019 | ......... A61B 1/00009 |
| JP | 2005099022 A | * | 4/2005 | ........... A61B 5/0064 |

(Continued)

OTHER PUBLICATIONS

Kaiwen Guo et al., "The Relightables: Volumetric Performance Capture of Humans with Realistic Relighting", Nov. 2019, vol. 38, No. 6, Article 217. ACM Transactions on Graphics.

(Continued)

*Primary Examiner* — Michael P Stafira
(74) *Attorney, Agent, or Firm* — ANOVA LAW GROUP, PLLC

(57) ABSTRACT

A three-dimensional (3D) object scanner includes: an object platform configured to host a target object; a projector device configured to project a first light pattern on to the target object; an LED screen that surrounds the object platform and configured to emit a second light pattern; an imaging device configured to obtain a plurality of images of the target object from multiple view angles as the target object and the imaging device are relatively rotated to multiple rotation degrees. The plurality of images include images obtained when the projector device projects the first light pattern and images obtained when the LED screen emits the second light pattern. The images are used to determine 3D information and texture information of the target object.

17 Claims, 10 Drawing Sheets

(58) Field of Classification Search
CPC ............. G01B 11/026; G01B 11/2504; G01B 11/2522; G01B 21/30; G01B 5/0014; G01B 21/042; G01B 21/32; G01B 2210/54; G01B 2210/56; G01B 5/0004
See application file for complete search history.

(56) References Cited

U.S. PATENT DOCUMENTS

| | | | |
|---|---|---|---|
| 11,107,195 B1 * | 8/2021 | Cordes ...................... | G06T 7/90 |
| 11,200,752 B1 | 12/2021 | Cordes et al. | |
| 2001/0019358 A1 * | 9/2001 | Waki .................... | H04N 9/3147 |
| | | | 348/189 |
| 2003/0160970 A1 * | 8/2003 | Basu ................. | G01B 11/2518 |
| | | | 356/601 |
| 2014/0168380 A1 * | 6/2014 | Heidemann ............ | G01B 11/25 |
| | | | 348/46 |
| 2014/0268160 A1 * | 9/2014 | Debevec ................ | G01B 11/30 |
| | | | 315/291 |
| 2018/0227570 A1 | 8/2018 | Page et al. | |
| 2019/0394436 A1 * | 12/2019 | Jia .......................... | G02B 30/10 |

FOREIGN PATENT DOCUMENTS

| | | | | |
|---|---|---|---|---|
| KR | 101777229 B1 | * | 9/2017 | |
| KR | 101816781 B1 | * | 1/2018 | |
| WO | WO-2004100561 A1 | * | 11/2004 | ........... H04N 13/243 |
| WO | WO-2018161648 A1 | * | 9/2018 | ............. G02B 30/10 |

OTHER PUBLICATIONS

Wojciech Matusik et al., "A Data-Driven Refectance Model", SIGGRAPH 2003.

Devin Coldewey, "How 'The Mandalorian' and ILM invisibly reinvented film and TV production", https://techcrunch.com/2020/02/20/how-the-mandalorian-and-ilm-invisibly-reinvented-film-and-tv-production/.

"The Light Stages at UC Berkeley and USC ICT", https://vgl.ict.usc.edu/LightStages/.

The World Intellectual Property Organization (WIPO) International Search Report for PCT/US23/64733 Jun. 28, 20223 8 Pages.

* cited by examiner

THREE-DIMENSIONAL OBJECT SCANNING DEVICE AND METHOD

FIELD OF THE TECHNOLOGY

This application relates to the field of object scanning technologies and, specifically, to a three-dimensional object scanning device and method.

BACKGROUND

A 3D object scanner typically aims to recover two aspects of a scanned object, geometry and surface texture map. The surface texture, however, is often affected by the environment lighting. The color and position of the light source can affect the appearance of the object and thus affect the recovered surface texture. Consequently, the reconstructed surface texture is bound to a specific lighting condition, not the intrinsic surface texture of the object. Further, a 3D object scanner in related art often relies on the object having a rich surface color pattern and geometric features, but has no control or knowledge of the lighting when capturing images, and it would fail if the object presented a plain surface color and/or a smooth surface shape.

The disclosed methods and systems are directed to solve one or more problems set forth above and other problems.

SUMMARY

One aspect of the present disclosure provides a three-dimensional (3D) object scanner includes: an object platform configured to host a target object; a projector device configured to project a first light pattern on to the target object; an LED screen that surrounds the object platform and configured to emit a second light pattern; an imaging device configured to obtain a plurality of images of the target object from multiple view angles as the target object and the imaging device are relatively rotated to multiple rotation degrees. The plurality of images include images obtained when the projector device projects the first light pattern and images obtained when the LED screen emits the second light pattern. The images are used to determine 3D information and texture information of the target object.

Another aspect of the present disclosure provides a 3D object scanning method applied to a 3D object scanner. The method includes: controlling a projector device of the 3D object scanner to project a first light pattern on to a target object hosted by an object platform; controlling an LED screen of the 3D object scanner to emit a second light pattern, the LED screen surrounding the object platform; and controlling an imaging device of the 3D object scanner to obtain plurality of images of the target object from multiple view angles as the target object and the imaging device are relatively rotated to multiple rotation degrees. The plurality of images include images obtained when the projector device projects the first light pattern and images obtained when the LED screen emits the second light pattern. The images are used to determine 3D information and texture information of the target object.

Another aspect of the present disclosure provides a non-transitory storage medium storing computer instructions. The computer instructions, when executed by a processor, cause the processor to perform: controlling a projector device of the 3D object scanner to project a first light pattern on to a target object hosted by an object platform; controlling an LED screen of the 3D object scanner to emit a second light pattern, the LED screen surrounding the object platform; and controlling an imaging device of the 3D object scanner to obtain plurality of images of the target object from multiple view angles as the target object and the imaging device are relatively rotated to multiple rotation degrees. The plurality of images include images obtained when the projector device projects the first light pattern and images obtained when the LED screen emits the second light pattern. The images are used to determine 3D information and texture information of the target object.

Other aspects of the present disclosure can be understood by those skilled in the art in light of the description, the claims, and the drawings of the present disclosure.

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure.

The present disclosure provides a three-dimensional (3D) object scanning device (also referred to as a 3D object scanner) that can digitalize a physical object. In contrast to 3D object scanners in related art, the disclosed 3D object scanner includes a projector device and an LED screen which can facilitate recovering 3D geometry and intrinsic surface material at the same time for arbitrarily shaped objects. A virtual object model produced based on the scanning result of the disclosed 3D object scanner that can be viewed from any viewpoint and under arbitrary lighting condition. The disclosed 3D object scanner also enables the object to be directly captured under an arbitrary lighting condition. The digitalized object can be viewed as a high-quality digital twin of the physical object, which has a myriad of applications, from virtual museum exhibitions, relics preservation, digital content creation, to virtual reality (VR), augmented reality (AR), metaverse, 3D printing, etc.

Figure 1:
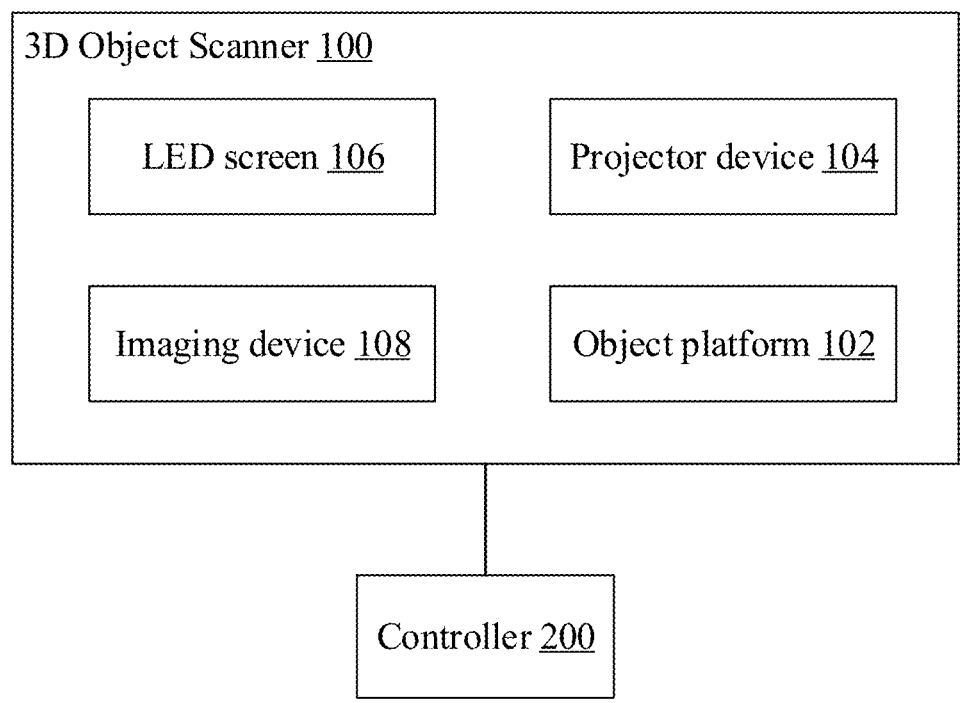
FIG. 1 illustrates a structural diagram of a three-dimensional object scanning device consistent with embodiments of the present disclosure.

FIG. 1 illustrates a structural diagram of a three-dimensional object scanning device consistent with embodiments of the present disclosure. As shown in FIG. 1, an example 3D object scanning device 100 includes an object platform 102, a projector device 104, an LED screen 106, and an imaging device 108.

The object platform 102 is configured to host a target object to be scanned. The imaging device 108 is configured to obtain a plurality of images of the target object from multiple view angles as the target object and the imaging device 108 are relatively rotated to multiple rotation degrees. In one embodiment, the imaging device 108 is rotatable and the object platform 102 is disposed at a fixed position. In another embodiment, the object platform 102 is rotatable and the imaging device 108 is disposed at a fixed position. The images are used to determine 3D information and texture information of the target object.

The projector device 104 is configured to project a first light pattern on to the target object. The LED screen 106 surrounds the object platform 102 and is configured to emit a second light pattern. A distance between the LED screen 106 and the object platform 102 being greater than a distance between the projector device 104 and the object platform 102. The plurality of images taken by the imaging device 108 include images obtained when the projector device 104 projects the first light pattern and images obtained when the LED screen 106 emits the second light pattern. The projector device 104 can produce carefully designed shading patterns on the target object to improve the quality of 3D reconstruction and camera registration. By controlling pixel intensities on the LED screen 106, the 3D object scanner 100 can set the environment lighting of the scanned object. After digitalizing the object, the digital model of the object can be rendered under arbitrary lighting condition. In addition, the LED screen 106 can help to recover the surface material of the scanned object.

Figure 2A:
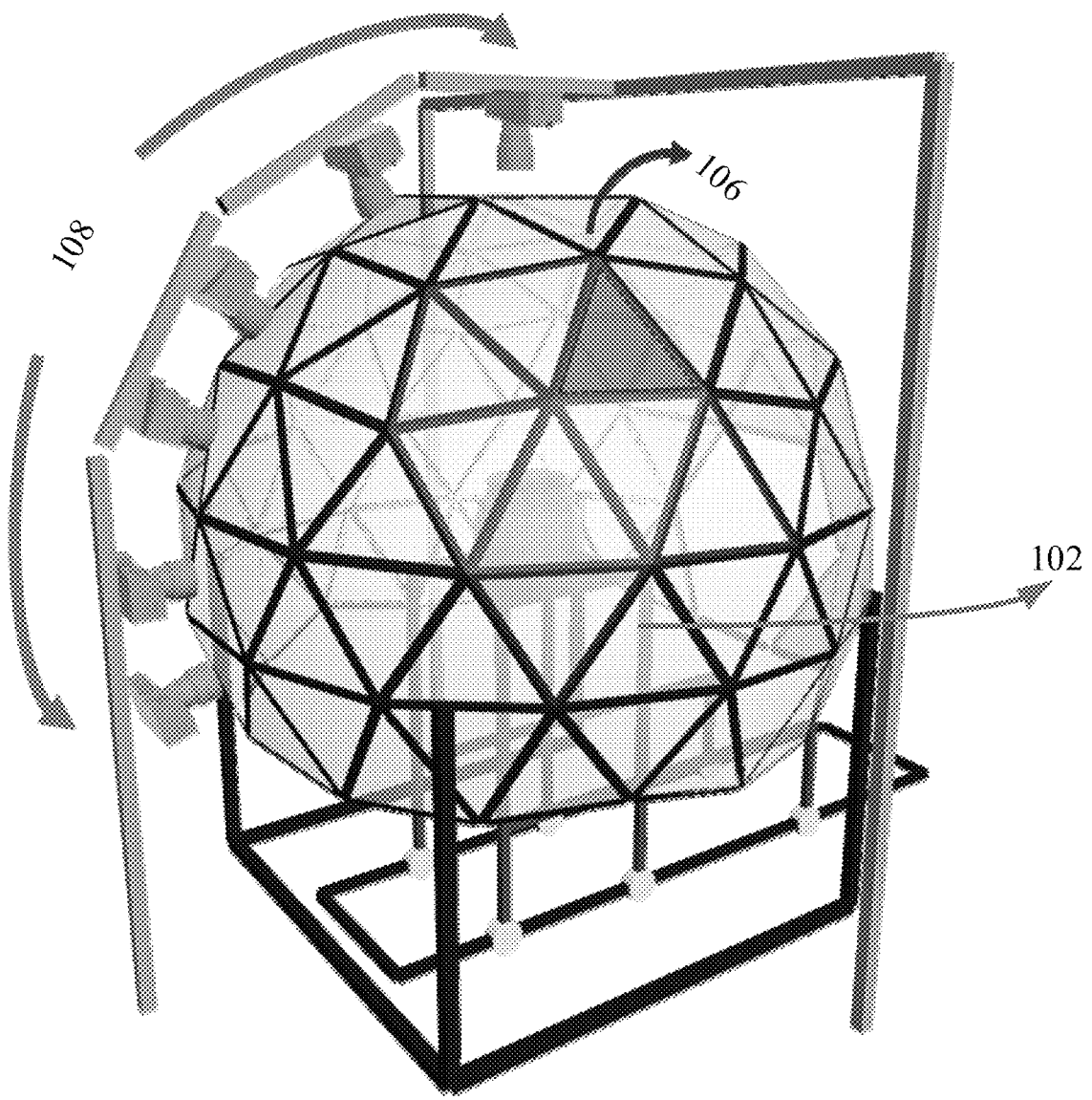
FIG. 2A and FIG. 2B illustrate examples of 3D object scanning devices consistent with certain embodiments of the present disclosure.
Figure 2B:
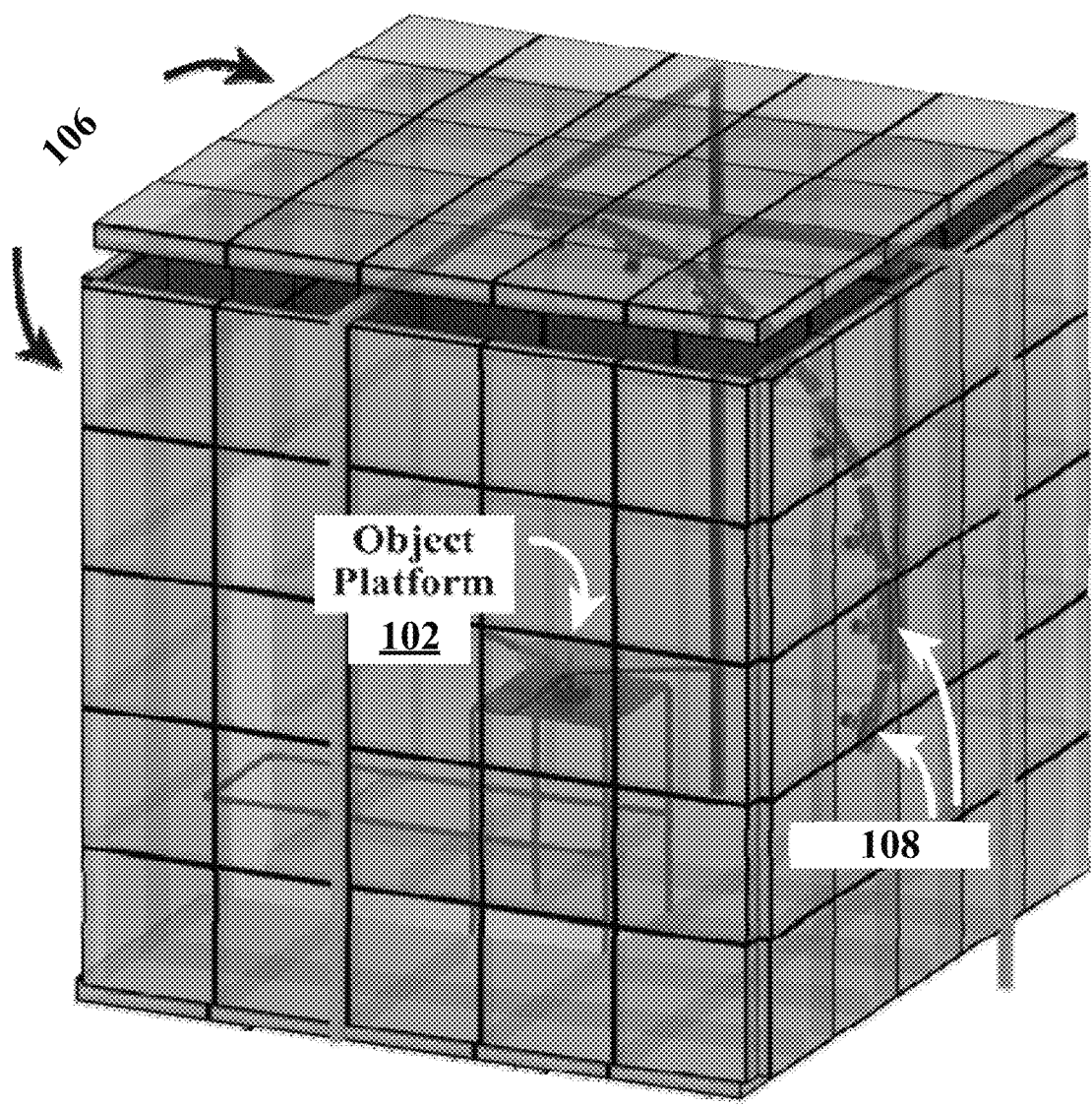

FIG. 2A and FIG. 2B illustrate examples of 3D object scanning devices consistent with certain embodiments of the present disclosure. A target object can be placed at a center of a rotation table of the object platform 102. A shape of the LED screen 106 can be configured to enclose the target object on the object platform 102, providing light patterns/sources illuminating a central area where the target object is located from multiple directions. The shape may also enclose a projector of the projector device 104. The shape can be, for example, a sphere shape (as shown in FIG. 2A), a cube shape (as shown in FIG. 2B), geodesic dome shape, a hemisphere, etc. The disclosed 3D object scanner 100 has a full control the individual pixel intensity on the LED screen 106, thereby facilitating creation of a high resolution, high dynamic range environment lighting map.

In some embodiments, the LED screen 106 may include multiple LED panels. Hereinafter, in some embodiments, the LED screen 106 may also be referred to as LED panels. In some embodiments, the LED panels may have substantially the same shape and dimensions, such as the triangle panels shown in FIG. 2A and the rectangle panels shown in FIG. 2B. When the LED screen 106 has a 2 v geodesic dome, it may contain two groups of different sized triangle panels. Using LED panels with same configuration can reduce manufacturing cost. In some other embodiments, the LED screen 106 may include one or more customized-shaped LED panels.

In some embodiments, the multiple LED panels of the LED screen 106 may be interconnected. An angle formed by two interconnecting LED panels may vary based on a desired shape of the LED screen 106. In one example, when the LED screen 106 has a cube shape, an angle formed by two interconnecting LED panels belonging to a same face of the LED screen 106 may be 180°, an angle formed by interconnecting LED panels respectively belonging to two faces of the LED screen 106 may be 90°. In another example, when the LED screen 106 has a dome shape, an angle formed by two interconnecting LED panels may be greater than 90° and less than 180°.

The imaging device 108 are configured to obtain images of an object from its top to side surface. In some embodiments, the imaging device 108 may include a plurality of cameras mounted on a frame. Hereinafter, an image set may refer to images of an object obtained by the imaging device 108 at a same setting (e.g., same rotation degree of the object with respect to a rotation axis, same environmental lighting provided by the LED panels, under same projector pattern, etc.) from different view angles (e.g., from the plurality of cameras). The frame may include an arc-shaped or approximately-arc-shaped part for mounting the cameras. In some embodiments, the cameras may be uniformly distributed. For example, FIG. 2B illustrates an imaging device 108 with eight cameras and the angle between each two neighboring cameras is around 10 to 15 degrees. The eight cameras collectively span a total angle around 90 to 105 degrees. FIG. 2A illustrates an imaging device 108 with six cameras. The number of cameras can be an integer greater than 1.

A camera of the imaging device 108, as used herein, may refer to any suitable imaging sensor capable of capturing imaging information of the target object, such as passive imaging sensor (such as a single-lens camera, a stereo camera, a depth sensor) or an active imaging device 108 (e.g., a time-of-flight camera). When the time-of-flight camera is used, the 3D object scanner 100 may further include a modulated light source. In some embodiments, the LED screen 106 may be used as the modulated light source. In some embodiments, the modulated light source and the time-of-flight camera may be included in a same apparatus.

In some embodiments, the frame may include a movable structure configured to mount one or more cameras and drive the one or more cameras to move along a path and stop at multiple positions on the path to obtain images of the target object from the multiple view angles, each stopping position corresponding to one of the multiple view angles. The multiple stopping positions on the path may have substantially the same distance to the object platform 102 (e.g., same radial distance to a center of the object platform 102). The path may be an arc. The arc may span an angle (e.g., polar angle using the center of the object platform 102 as the origin) around 90 to 105 degrees. The movable structure may drive the one or more cameras to stop at different positions to have different viewpoints with respect to the target object, and the one or more cameras may capture images of the target object when stopped at the different angles/viewpoints. The movable structure may include an arc track with a movable seat that travels along the arc track, a robot arm, or other suitable structure to house and move the one or more cameras to reach different view angles with respect to the target object.

In some embodiments, the imaging device 108 may be positioned inside an enclosure provided by the LED screen 106, as shown in FIG. 2B. In some embodiments, the imaging device 108 may not be positioned inside the enclosure provided by the LED screen 106, as shown in FIG. 2A.

When the imaging device 108 is not positioned inside the enclosure provided by the LED screen 106, the LED screen 106 does not block an optical path of the imaging device 108. In other words, a light path between the imaging device 108 and the object platform 102 can pass through a part of the enclosure provided by the LED screen 106. For example, the enclosure shape of the LED screen 106 may include a part through which the optical path of the imaging device 108 can pass. The part may be hollowed, transparent, or may include any suitable optical device that does not block the light path.

In some embodiments, the object platform 102 (e.g., a plate used to hold an object to be scanned) is located at a center of a cross-sectional plane of the LED screen 106. In some embodiments, a distance between a center of an object-placing surface of the object platform 102 (hereinafter abbreviated object center) and the LED screen 106 may be 1.5-3 times of a distance between the object center to a projector of the projector device 104. For example, a distance between the object center and the LED screen 106 is about 1 to 1.25 m; a distance between the object center and a camera of the imaging device 108 is about 0.8 m; and a distance between the object center and a projector of the projector device 104 is about 0.5 m.

In some embodiments, using the object center as an origin of a spherical coordinate system, the enclosure shape of the LED screen 106 may cover the object center with an azimuthal angle range from 0 to $2\pi$ and a polar angle range from 0 to $\pi$. In some embodiments, the enclosure shape of the LED screen 106 may cover the object center with an azimuthal angle range from 0 to $2\pi$ and a polar angle range from $-\pi/3$ to $4/3\pi$.

Figure 3:
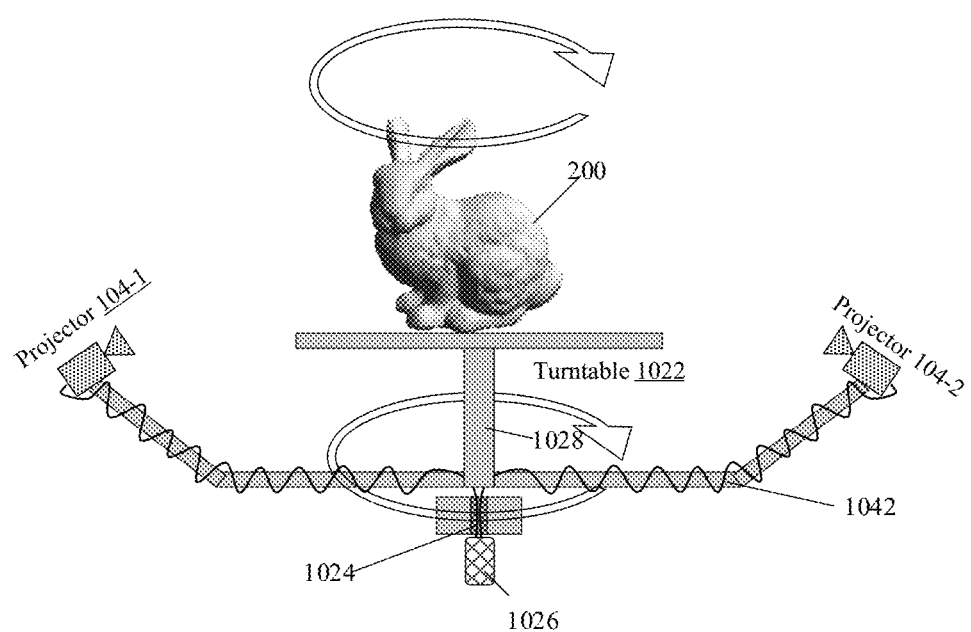
FIG. 3 illustrates an example object platform mounted with projectors consistent with certain embodiments of the present disclosure.

FIG. 3 illustrates an example object platform 102 mounted with a projector device 104 consistent with certain embodiments of the present disclosure. As shown in FIG. 3, the object platform 102 may include a turntable 1022. The turntable 1022 can be configured to rotate 360-degrees along a vertical axis 1028 at its center. The rotation of the turntable 1022 can be driven manually or automatically (e.g., using an electric motor). The turntable 1022 can be fixedly mounted on a stationary base (not shown). The base may be placed on a ground or other stable structure. In operation, the target object 200 can be placed on a top surface of the turntable 1022. In some embodiments, at least part of the object platform 102 (e.g., the turntable 1022) can be made of a transparent material such as transparent acrylic, so the camera at a lower view angle can capture some features of the bottom of the object to be scanned. In some embodiments, the turntable 1022 may further include additional brackets to hold an object with no flat surface. In some embodiment, a rotation speed of the turntable 1022 can be adjusted, e.g., can be slowed down to reduce shaking and unstable movement.

The projector device 104 may include projectors 104-1 and 104-2 which are mounted on an outer edge of the turntable 1022, such as on extending arms of the turntable 1022, or on peripheral region of a plate of the turntable 1022. The projectors 104-1 and 104-2 face the vertical axis 1028 so that the light pattern can be projected on to the target object 200. In some embodiments, the projectors 104-1 and 104-2 can be fixed with respect to the object. In some embodiments, a horizontal level of the projectors 104-1 and 104-2 are equal to or lower than that of the top surface of the turntable 1022. It can be understood that although FIG. 3 shows two projectors, the projector device 104 may include k projectors, k being an integer greater than 1. In some embodiments, the k projectors can be located on a same horizontal plane and have a same distance to the vertical axis 1028. In some embodiments, the k projector can be evenly distributed on a circumference of the object platform 102. The angular interval between neighboring projectors may be the same. For example, when k is 3, radians of the projectors are 0, $2/3\pi$, and $4/3\pi$.

The projectors 104-1 and 104-2 are driven to rotate together with the target object 200. The projector device 104 may further include cables 1042. The cables 1042 may include a power cable configured to transmit power from a power supply to the projector device 104, and a data cable configured to transmit projection data (e.g., light pattern, projector status) between a projector-control device (e.g., controller 200) and the projector device 104. The object platform 102 may further include a slip ring 1026 configured to transmit power and electrical signal from a stationary entity to a rotating structure, thereby avoiding cable twisting while the turntable 1022 is rotating. The cables 1042 may pass a through-hole 1024 in a lower part of the turntable 1022 and be connected to the slip ring 1026. For example, the power cable may be connected to the power supply through the slip ring 1026, and the data cable may be connected to the projector-control device through the slip ring 1026.

It can be understood that that although the illustrated embodiments show that the object platform 102 is rotatable and the imaging device 108 is fixed. In other embodiments, the object platform 102 can be fixed and the imaging device 108 can be rotatable. For example, the camera(s) of the imaging device 108 may be mounted on a rotatable part of the frame. The rotatable part is configured to drive the cameras to rotate to multiple rotation degrees around a vertical axis passing the center of the object platform 102. The slip ring can also be used to avoid power/data cables of the cameras being twisted.

Returning to FIG. 1, the 3D object scanner 100 may be controlled by a controller 200. The controller 200 may include one or more control devices configured to control the components of the 3D object scanner 100. The components being one or more of the object platform 102, the projector device 104, the LED screen 106, or the imaging device 108. One control device may correspond to one component or multiple components. A control device may be a separate device connected to its corresponding component through wired or wireless connection, or a device embedded within its corresponding component, or a combination thereof.

In some embodiments, the control device corresponding to the object platform 102 may be configured to control a rotation of the turntable 1022, such as initiating the rotation, stopping the rotation, and controlling the rotation degree of the turntable 1022. For example, the turntable 1022 may be rotated 10-15 degrees each time and stop for a certain duration so that the projector device 104 and/or the LED screen 106 can present one or more light patterns and the imaging device 108 can obtain images when the one or more light patterns are presented. In some embodiments, when stopped at each rotation degree, the control device corresponding to the object platform 102 may transmit a signal to the projector device 104 and/or the LED screen 106 to start presenting a light pattern. In some embodiments, when the imaging device 108 has completed obtaining images at one rotation degree, the control device corresponding to the object platform 102 may receive a signal to rotate the turntable 1022 again.

Figure 4:
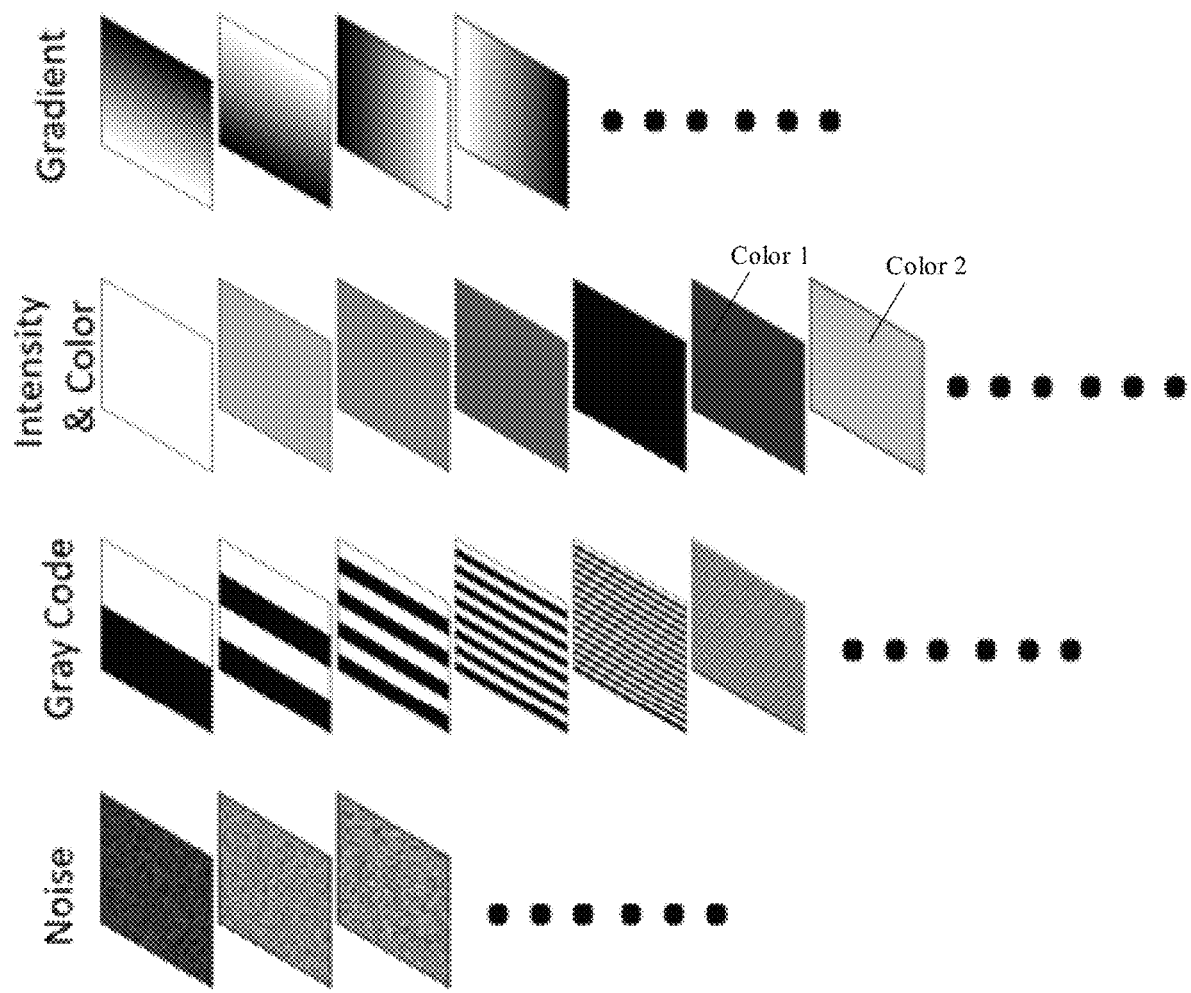
FIG. 4 illustrates example light patterns projected by a projector device consistent with certain embodiments of the present disclosure.

In some embodiments, the control device corresponding to the projector device 104 may be configured to control a projection process of the projector device 104, such as controlling certain projector of the projector device 104 to project certain light pattern for certain duration, and controlling the one or more projectors to stop projection. Hereinafter, the light pattern projected by the projector device 104 may be referred as a first light pattern, and an image obtained when a first light pattern is projected may be referred as first image. The first light pattern can include a set of various light patterns projected on the object surface for camera registration, shape reconstruction, and/or surface material analysis. FIG. 4 illustrates example light patterns projected by the projector device 104 consistent with certain embodiments of the present disclosure. As shown in FIG. 4, the first light pattern may include gradient patterns, intensity and color patterns, gray code patterns, and/or noise patterns. The color patterns may include a single-color pattern. In some embodiments, the plurality of projectors may project a same pattern (e.g., a noise pattern) at a same time. In some embodiments, the plurality of projectors may project a same pattern (e.g., a color pattern) in sequence. In some embodiments, the gray code patterns and noise patterns may be used for calibration; the gradient patterns, the different intensity and color patterns may be used for material estimation. In some embodiments, the control device corresponding to the projector device 104 may transmit a signal to the imaging device 108 to start obtaining images when a first light pattern is projected. In some embodiments, the control device corresponding to the projector device 104 may transmit a signal to the LED screen 106 to start emitting LED light patterns when projection of light patterns are completed.

Figure 5:
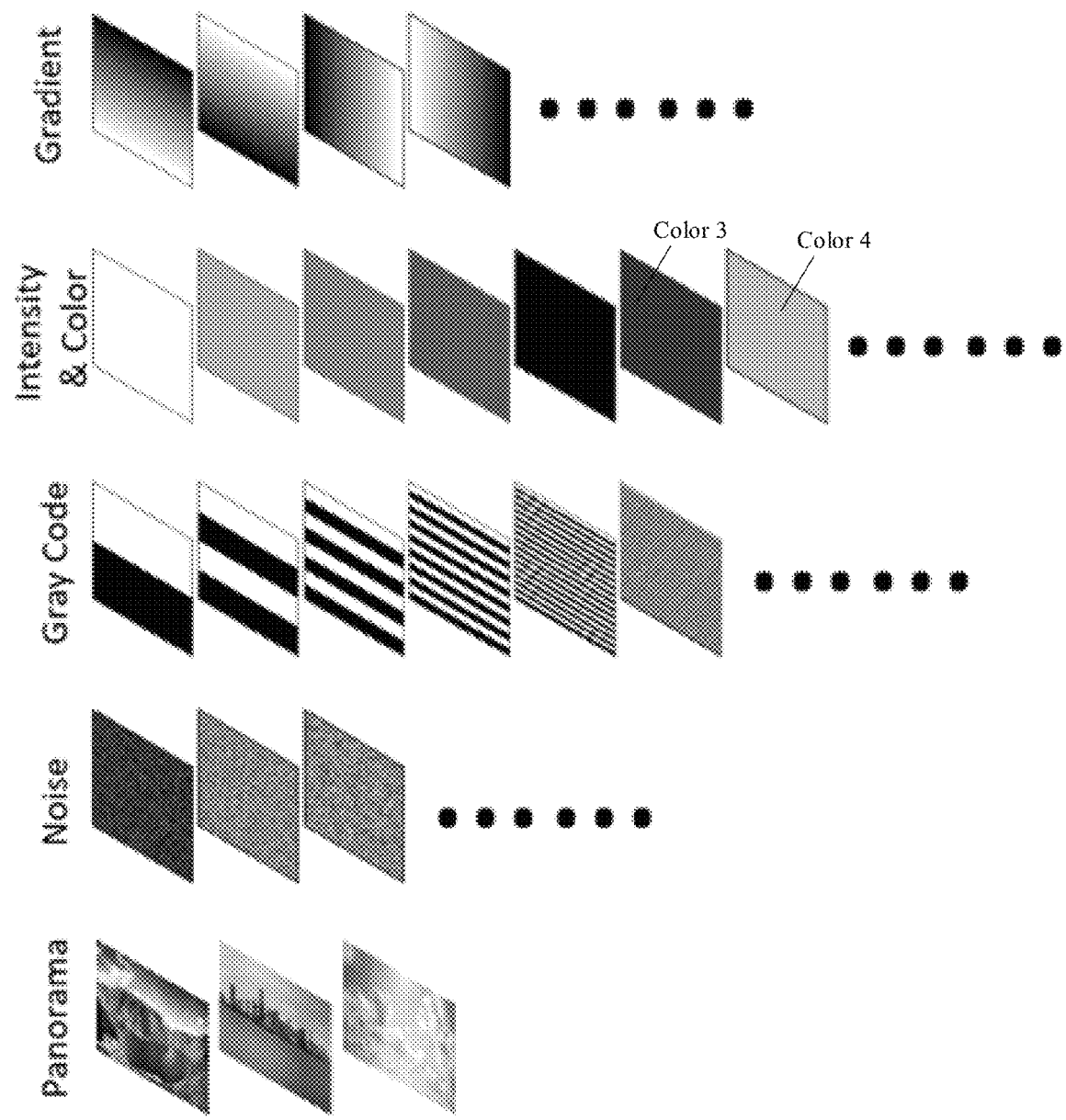
FIG. 5 illustrates example light patterns emitted by an LED screen consistent with certain embodiments of the present disclosure.

In some embodiments, the control device corresponding to the LED screen 106 may be configured to control a display process of the LED screen 106, such as controlling LED panel(s) of the LED screen 106 to emit certain light pattern for certain duration, and controlling the LED panel(s) to stop display. Hereinafter, a light pattern emitted by the LED screen 106 may be referred as second light pattern, and an image obtained when a second light pattern is emitted may be referred as second image. FIG. 5 illustrates example light patterns emitted by LED screen 106 consistent with certain embodiments of the present disclosure. As shown in FIG. 5, the second light pattern may include gradient patterns, intensity and color patterns, gray code patterns, noise patterns, and/or panorama patterns. In some embodiments, the gray code patterns may be used for calibration; the gradient patterns and noise patterns may be used for specular and diffuse separation; the different intensity and color patterns may be used for texture map generation; and/or the natural images and the panorama images may be used for re-lighting. In some embodiments, the control device corresponding to the LED screen 106 may transmit a signal to the imaging device 108 to start obtaining images when a second light pattern is projected.

In some embodiments, the control device corresponding to the imaging device 108 may be configured to control an imaging process of the imaging device 108, such as capturing and storing images of the target object when the first light pattern and/or the second light is presented. In some embodiments, the control device corresponding to the imaging device 108 may initiate image capture upon receiving an initiation signal (e.g., when the object platform 102 is rotated to a certain degree, when the first/second light pattern is displayed, when certain time is reached). In some embodiments, the control device corresponding to the imaging device 108 may automatically perform image capture at a set interval. For example, when there are 20 second light patterns to be emitted by the LED screen 106 at a speed of 3 seconds per pattern, the imaging device 108 can be controlled to capture a set of images every 3 seconds. In cases where the imaging device 108 is movable, the control device corresponding to the imaging device 108 may further configured to move the camera to a certain position for a certain duration, such as moving a camera to capture images from different viewing angles, or rotating a camera when the object platform 102 is not rotatable.

In some embodiments, the controller 200 may be configured to control the 3D object scanning device 100 to implement a calibration process and/or an object scanning process. The calibration process and/or an object scanning process may be fully automatic or semi-automatic. In a calibration or scanning process, the object platform 102 or the imaging device 108 may be configured to rotate to multiple rotation degrees and stop at each rotation degree for a certain time interval, the projector device 104 and/or the LED screen 106 may be configured to present designated light pattern(s) at designated timestamp(s), and the imaging device 108 may be configured to obtain images at designated timestamp(s).

In some embodiments, the controller 200 may store images obtained by the imaging device 108 and attribute information corresponding to the images. The attribute information can be used for calibration or reconstruction. The attribute information of an image may include at least one of a camera identifier indicating the camera that captures the image, a camera view angle indicating a view angle of the camera when the image is captured, a timestamp indicating the time when the image is captured, a projector identifier indicating a projector projecting a first light pattern when the image is captured, a projector pattern identifier indicating the first light pattern being projected when the image is captured, an LED pattern identifier indicating a second light pattern being emitted by the LED screen 106 when the image is captured, or a rotation degree indicating which part of the object is being captured by the image, etc.

Figure 6:
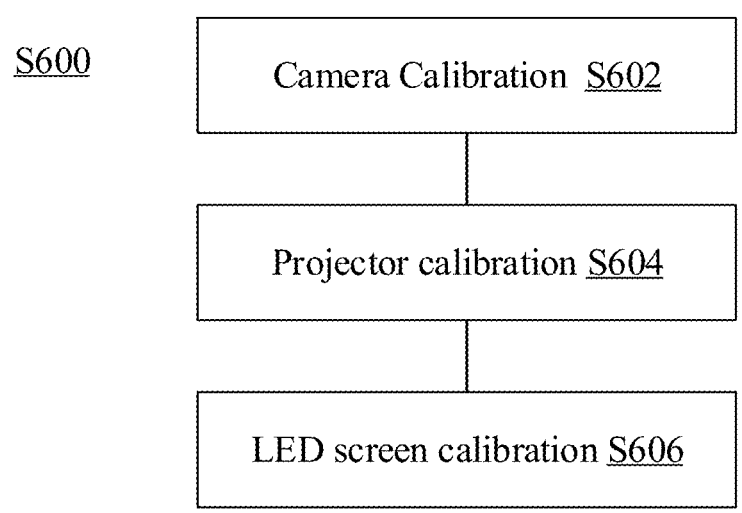
FIG. 6 illustrates a flowchart of a calibration process for a 3D object scanning device consistent with certain embodiments of the present disclosure.

The present disclosure further provides a calibration process suitable for the disclosed 3D object scanning device. FIG. 6 illustrates a flowchart of a calibration process for a 3D object scanning device consistent with certain embodiments of the present disclosure. The calibration process can be implemented by the 3D object scanner 100, the controller device 200, or the combination thereof.

As shown in FIG. 6, the calibration process 600 may include camera calibration S602 for the imaging device 108, projector calibration S604 for the projector device 104, and/or LED screen 106 calibration S606 for the LED screen 106.

The camera calibration S602 can be performed to obtain intrinsic and extrinsic parameters of the camera(s) in the imaging device 108. Parameters of a camera may include: focal length, aperture, field-of-view, resolution, position of the camera, orientation of the camera, etc. The position and orientation of the camera can be recorded with respect to a world/global coordinate system established for the 3D object scanner 100. The parameters can later be used in object reconstruction process.

The camera calibration S602 may include capturing image(s) of calibration board(s) placed at different locations in the field-of-view of the camera(s) of the imaging device 108, and calculating parameters of corresponding camera(s) based on the captured image(s). In some embodiments, a calibration board may be a checker board.

The projector calibration S604 can be performed to obtain parameters of each projector in the projector device 104. Parameters of a projector may include position, orientation, intensity, etc. The projector calibration S604 may include obtaining a calibration image of a projector calibration object placed on the objector platform when a projector to be calibrated projects a light pattern on the projector calibration object, and obtaining parameters of the projector based on the calibration image. In some embodiments, multiple calibration images of the projector calibration object from multiple viewpoints are obtained for the same projection calibration light pattern, thereby improving calibration accuracy. In some embodiments, multiple projectors can project different color patterns at the same time, and the multiple projectors can be calibrated at the same time using color/wavelength multiplexing method. For example, when there are three projectors have no overlapping projection region, every two projectors can be calibrated for their relative position separately and later combine all three into one global coordinate. In some embodiments, the projector calibration object is a diffusive white sphere. In some embodiments, a position of a rotation axis of the object platform 102 or the imaging device 108 in a world coordinate system can also calculated based on the calibration images.

LED screen 106 calibration S606 can be performed to obtain parameters of pixels of the LED screen 106, and may include coordinate alignment and color calibration. The parameters of a pixel may include location, pixel intensity, dynamic range, etc. The LED screen 106 calibration S606 may include capturing images of an LED calibration object when the LED screen 106 emits a calibration light pattern, and obtaining parameters of pixels of the LED screen 106 based on the captured images. In some embodiments, the calibration light pattern may include a series of light patterns. By registering the images captured by the cameras, a direction and an irradiance of a light ray coming from each pixel on the LED screen 106 can be estimated. With the incoming light rays, the 3D position of each pixel on the LED panels is computed and then fit a plane for each LED panel to obtain its normal direction. Taking into account the angle between a light ray and the LED panel's normal direction, the irradiance change of a pixel with respect to the light ray outgoing direction can be estimated. In some embodiments, the LED calibration object is a chrome ball. In some embodiments, after calibration, the irradiance change of a pixel due to impact of direction can be compensated with intensity of the pixel. In some embodiments, a position of a rotation axis of the object platform 102 or the imaging device 108 in a world coordinate system can also calculated based on the captured images.

It can be understood that the projector calibration S604 and the LED screen 106 calibration S606 can be independently performed and do not need to occur in sequence as shown in FIG. 6.

Figure 7:
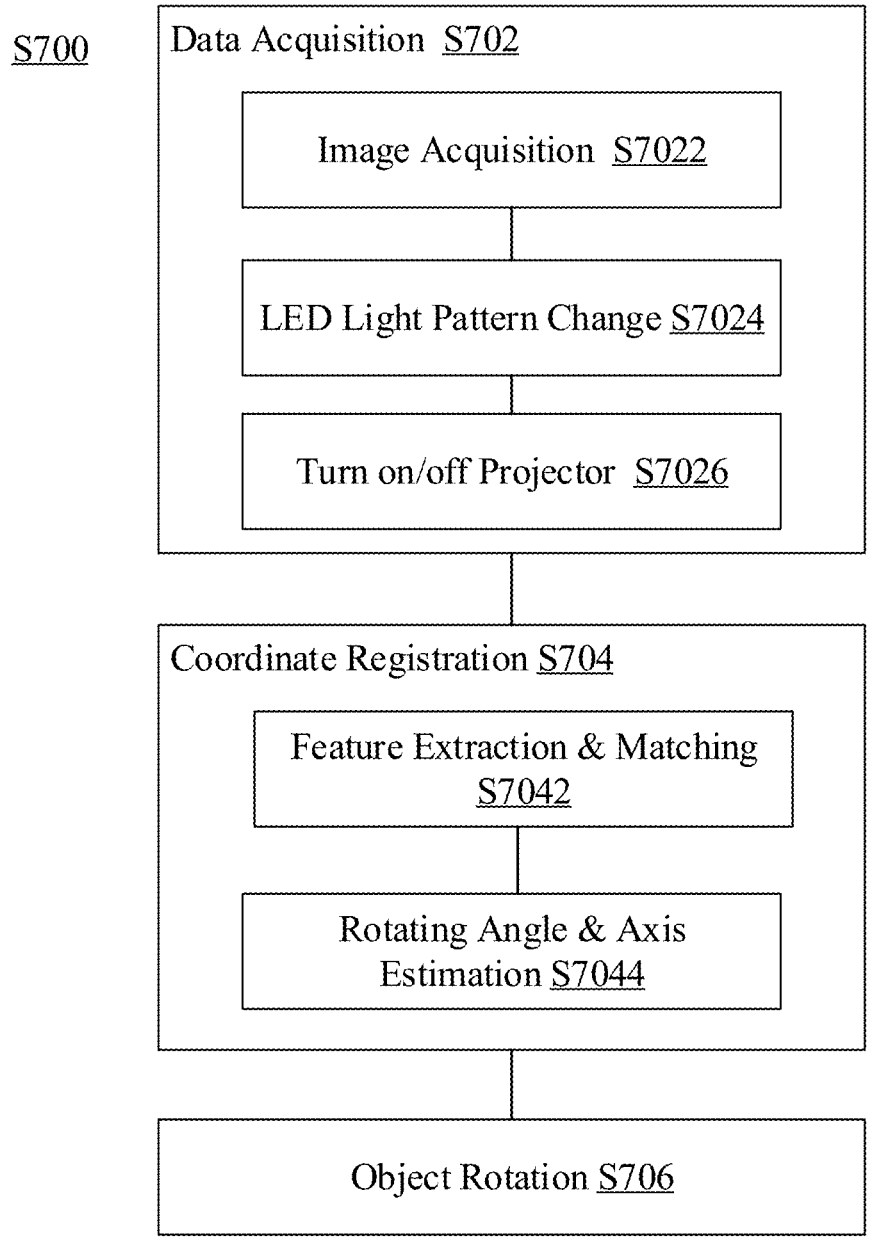
FIG. 7 illustrates a flowchart of a 3D object scanning process consistent with certain embodiments of the present disclosure.

FIG. 7 illustrates a flowchart of a 3D object scanning process consistent with certain embodiments of the present disclosure. The scanning process can be implemented by the 3D object scanner 100, the controller device 200, or the combination thereof.

As shown in FIG. 7, the scanning process S700 may include data acquisition (S702) and object rotation (S706). The data acquisition (S702) may include obtaining image data of the target object when certain light pattern is presented by the LED screen 106 and/or the projector device 104. The object rotation (S706) may include rotating the target object with respect to the imaging device 108 (e.g., by either rotating the object platform 102 or the imaging device 108) and stopping the rotation at multiple rotation degrees. The rotation degree of the target object, or rotation angle of the target object, as used herein, may refer to a rotation degree of the target object along an axis perpendicular to a plane where the target object is placed at. The rotation degree may range from 0 to 360 degrees. In some embodiments, the rotation degree interval may be 10 to 15 degrees. That is, the object platform 102 or imaging device 108 stops rotating at each 10 to 15 degrees. In some embodiments, the rotation degree interval may be determined based on a specularity of the target object. A higher specularity may correspond to a smaller rotation degree interval. In some embodiments, the specularity may be estimated at the beginning of the scanning process when the target object is placed but not yet rotated. For example, the LED screen 106 may display a series of illumination patterns and the imaging device 108 may capture corresponding images. The specularity may be estimated according to captured image intensity variation on the object surface, thereby determining the rotation degree interval for subsequent objection rotation (S706) step(s).

The data acquisition (S702) can be performed for each of the multiple object rotation degrees. In some embodiments, the object rotation (S706) can be performed after the data acquisition (S702) for the current rotation degree is completed.

In some embodiments, the data acquisition (S702) process may include image acquisition (S7022), LED light pattern change (S7024) and turning on/off the projector device 104 (S7026). In one embodiment, after the target object is placed on the object platform 102 at the current rotation degree, the imaging device 108 can obtain (S7022) first images of the target object when the projector device 104 is on and projects a first light pattern. In some embodiments, k projectors may be sequentially turned on and off to project a same pattern, and images may be captured each time a projector is on to obtain k sets of first images. The projector device 104 may be turned off (S7026). The LED screen 106 may emit (S7024) a second light pattern and the imaging device 108 can obtain (S7022) second images when the LED screen 106 emits the second light pattern. In some embodiments, the LED screen 106 may emit multiple light patterns. When the LED screen 106 changes (S7026) the emitted light pattern, the imaging device 108 may obtain a set of images of the target object corresponding to the current light pattern. In some examples, when the projector device 104 is on, the LED screen 106 is off, and vice versa.

In another embodiment, after the target object is placed on the object platform 102 at the current rotation degree, the LED screen 106 may display (S7026) a current LED light pattern, and the imaging device 108 may obtain (S7022) two sets of images for the target object, one set taken with the projector device 104 being turned on (S7026) and projecting a designated projection pattern, and the other set taken with the projector device 104 being turned off (S7026). The LED screen 106 may change (S7026) to display a next LED light pattern while the target object is at the current rotation degree, and the imaging device 108 may obtain (S7022) next two sets of images for the target object, one set taken with the projector device 104 being turned on (S7026) and projecting the designated projection pattern, and the other set taken with the projector device 104 being turned off (S7026).

In some embodiments, the first light pattern projected by the projector device 104 at S7026 may include one or more color patterns. The projected color patterns can lead to rich features on the corresponding captured images. In some embodiments, the projectors have fixed locations with respect to the object in the data acquisition step. Accordingly, the patterns projected by the projector are always fixed in place on the object, thereby enriching subject's surface features. The enriched surface features greatly improve the accuracy of the object's pose registration and reconstruction.

In some embodiments, the scanning process S700 may further include coordinate registration (S704) which can be performed for each of the multiple object rotation degrees respectively. In some embodiments, the coordinate registration (S704) can be performed in parallel with the scanning process. In some embodiments, the object rotation (S706) process does not need to wait for completion of the coordinate registration (S704) for the current rotation degree to rotate to a next rotation degree. In some embodiments, the coordinate registration (S704) for the multiple object rotation degrees can be performed after the scanning process.

In some embodiments, the coordinate registration (S704) may include feature extraction and matching (S7042) and estimation of rotating angle and axis (S7044). The feature extraction is performed on each image in an image set. The matching is performed across images in one image set that are captured from different view angles with the same light pattern based on the result of feature extraction, to find pixels in the set of images that correspond to the same point on the object. In some embodiments, the coordinate registration (S704) may be performed on image sets obtained when the projector device 104 is on and the LED screen 106 is off. By matching features in the images taken across multiple steps (i.e., multiple rotation degrees), the camera positions with respect to the previous step can be used to estimate the camera's rotation and position with respect to the target object. With this information, the background LED environment lighting map (i.e., the second light pattern emitted by the LED screen 106) can be warped to align with the current pose of the target object, and obtain invariant environment illumination throughout the 360-degree capture. For example, when estimated results from coordinate registration (S704) using a set of first images indicate that the object is rotated 15 degrees with respect to an axis since the previous step, the LED screen 106 can rotate a second light pattern used in previous step for 15 degrees as well to align with the rotation of the object, so that the environment illumination provided by the LED screen 106 with respect to the object remains unchanged.

In some embodiments, the object scanning process S700 can be fully automatic. A series of illumination patterns can be displayed on the LED panels and images can be captured. Determined by the captured image intensity variation on the object surface, the rotation angle interval for subsequent captures can be set. Each time after the target object is rotated to a different angle, the projectors project a light pattern on the object surface. The rotation axis and angle can be estimated accordingly, which are in turn used to register the LED panels and determine their displayed light patterns after each rotation step. For example, the light pattern displayed by the LED panels can also be rotated based on the rotation axis and angle (e.g., estimated from images taken when the projector device 104 is on) after each rotation step, so that the object is illuminated by a fixed environment lighting (e.g., environment lighting provided by the rotated light pattern emitted by the LED panels) after each rotation step. Once this is done, multiple light patterns can be displayed on the LED panels, and per-pixel light reflectance of the object can be computed based on the captured images.

In some embodiments, the scanning process (S700) may be performed multiple times on the same object with different placement positions. For example, the scanning process (S700) may be performed when the object is placed face up, and performed again when the object is placed face down, so that 3D information and texture information of the entire surface of the object can be reconstructed.

In some embodiments, images of the object under different lighting conditions can be obtained by changing the second light pattern displayed by the LED screen 106. The second light pattern can be the panorama pattern example as shown in FIG. 5. In existing technologies, it is difficult to capture the object from different angles under a specific environment lighting, because image capturing take a certain amount of time, during which the environment may change. The disclosed 3D object scanner can provide a fixed environment lighting, e.g., by obtaining a 360-degree panorama image and displaying the panorama image on the LED panels for any desired duration. In addition, the disclosed 3D object scanner can display rendered virtual environments that are difficult to set up in the real world (such as Mars, underwater, and even fairyland), and obtain images of the target object corresponding to any desired environment.

Figure 8:
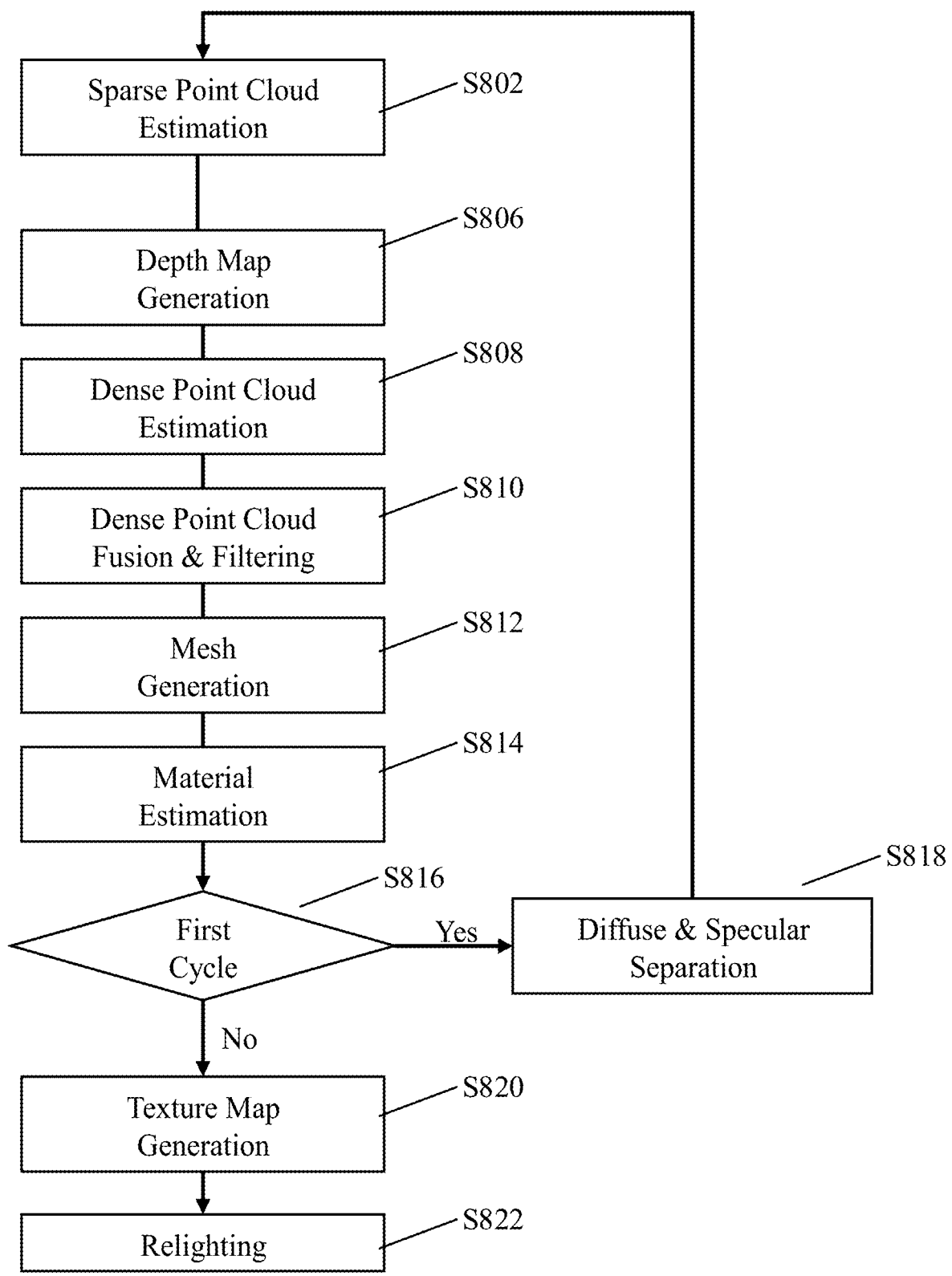
FIG. 8 illustrates a flowchart of a 3D object reconstruction process consistent with certain embodiments of the present disclosure.

FIG. 8 illustrates a flowchart of a 3D object reconstruction process consistent with certain embodiments of the present disclosure. The reconstruction process can be implemented by the 3D object scanner 100, the controller device 200, any suitable computing device, or the combination thereof.

Data used for the reconstruction may include: output of the scanning process (e.g., images and attribute information), LED light patterns used in the scanning process, projector color patterns used in the scanning process, camera calibration result (e.g., extrinsic and intrinsic parameters of the cameras), projector calibration result (e.g., position and orientation of the projector, and irradiances of light rays coming out from the projector), LED calibration result (e.g., LED pixel positions and irradiance of LED pixels).

As shown in FIG. 8, the reconstruction process S800 may include sparse point cloud reconstruction/estimation (S802), depth map generation (S806), dense point cloud reconstruction/estimation (S808), dense point cloud fusion and filtering (S810), and mesh generation (S812). A 3D mesh of the target object can be obtained from the mesh generation and can provide an accurate normal map. Material estimation (S814) includes estimating properties of the object such as roughness, refractive index, sub-surface scattering, transparency, etc. The material estimation may include obtaining reflectance model of the target object. The reflectance model may include a bidirectional reflectance distribution function (BRDF). In some embodiments, when positions of the projectors are relatively fixed with respect to the object, the in-coming light direction is fixed, and computation of the BRDF of the target object can be simplified based on the fixed incident light and pre-calibrated position and intensity of the projector.

When it is the first cycle (S816, Yes), diffuse and specular separation (S818) is performed after material estimation. The diffuse and specular separation (S818) may be performed on first images captured when the projector device 104 is on (e.g., when the LED panels are off) according to projector calibration result (e.g., position and irradiance of projectors), 3D shape and normal map of the target object obtained from the mesh generation (S812), and the reflectance model from the material estimation (S814). The diffuse and specular separation (S818) may also be performed on second images captured when the LED screen 106 is on (e.g., and when the projector is off) according to LED calibration result (e.g., position and irradiance of pixels of LED panels), 3D shape and normal map of the target object obtained from the mesh generation (S812), and the reflectance model from the material estimation (S814). An initial image (e.g., an image not processed for diffuse and specular separation) reflects a combined result of specular highlight from a light source (e.g., projector, LED panels) and diffuse light (e.g., from intrinsic albedo of the target object). Due to different positions and incident light directions, parts of the initial image may be differently affected by the specular light. The specular light value in the initial image can be determined based on material estimation of the target object. For example, BRDF can be used to model the reflectance of a surface part of the target object with an incident light (e.g., caused by a LED pixel or a light ray from a projector) based on calibrated result of the source of the incident light (e.g., direction and irradiance of the LED pixel or the light ray from the projector). The specular value can be subtracted from the initial image to get a diffuse-only image. In some embodiments, the specular highlight may only appear at a certain camera view angle, an initial image captured at the certain viewing angle can be compared with another initial image captured at another view angle to extract the specular highlight and recover the diffuse color.

The diffuse-only images can be used in a next round of sparse point cloud reconstruction/estimation (S802), depth map generation (S806), dense point cloud reconstruction/estimation (S808), dense point cloud fusion and filtering (S810), mesh generation (S812), and material estimation (S814). In some embodiments, the second round of steps S802-S814 is performed on diffuse-only images obtained from first images corresponding to projectors to improve the results for sparse point cloud estimation, mesh generation, and material estimation.

Since it is not the first cycle (S816, No), a texture map can also be constructed (S820) to obtain surface reflection coefficient and other appearance parameters of the target object. In some embodiments, the texture map indicates texture and color of the target object under white background lighting provided by the LEDS screen 106.

The reconstruction process consistent with embodiments of the present disclosure can extract accurate surface material information regardless of the object's geometric shape. The surface material information may include, for example, reflectance, refractive index, and BRDF, etc. Existing methods typically assume that a shape of the object is sufficiently simple (such as sphere or plane) in order to measure its surface reflectance or BRDF. The disclosed reconstruction process can recover a high-resolution 3D mesh, which provides accurate surface normal; and based on images taken when the LED screen 106 illuminates the target object from all direction and generates incident light directions along the normal, the reflection coefficients can be estimated more accurately.

In some embodiments, the reconstruction process S800 may further include a rendering and relighting step (S822). The 3D model obtained from second round of mesh generation (S812), surface textures obtained from second round of material estimation (S814), and appearance model obtained from texture map generation (S820) can be used to render the target object in a virtual scene. In addition, the images obtained from the scanning process can be used in an image-based rendering task to render additional images of the target object from a view angle other than the view angles used in the scanning process, and/or under an environment lighting other than the light patterns used in the scanning process. The image-based rendering task may be accomplished with a deep neural network model, such as neural radiance field (NeRF).

The present disclosure also provides a non-transitory storage medium storing computer instructions. The computer instructions, when executed by a processor, cause the processor to perform the disclosed calibration process, scanning process, and/or the reconstruction process.

The disclosed 3D object scanner can facilitate high quality 3D reconstruction, even for objects which are known difficult to reconstruct in existing approaches. For example, objects without rich surface textures, and/or with high specularity and geometric symmetry pose significant challenges to existing approaches. These objects present few surface features, and as a result, it is difficult to find correspondences across images from different views. In contrast, the disclosed 3D object scanner can use projectors to introduce surface features regardless of the surface texture of the object.

The disclosed reconstruction process can accurate information about the target object, including surface texture, reflection coefficient, normal map, and translucency. These information can be used in high quality rendering applications, such as in gaming and film making.

In addition, since the disclosed object scanner can capture images of an object under different lighting conditions, and the disclosed object scanner is fully calibrated with the camera's parameters (such as positions, view directions, and focal length). The captured images together with the precise camera information can be useful for training neural networks in many applications.

Figure 9:
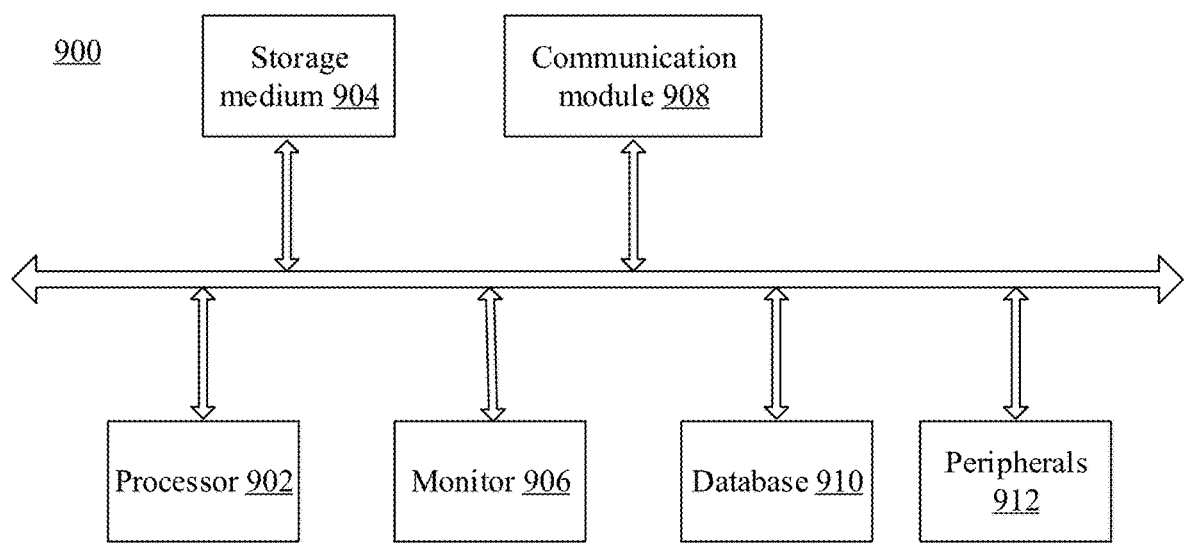
FIG. 9 illustrates a computer system consistent with embodiments of the present disclosure.

FIG. 9 illustrates an exemplary computer system implementing certain aspects of the 3D object scanner 100, the controller 200, and/or other computing device used for the disclosed calibration, scanning, and/or reconstruction process. As shown in FIG. 9, computer system 900 may include a processor 902, storage medium 904, a monitor 906, a communication module 908, a database 910, and peripherals 912. The components shown in FIG. 9 are illustrative, certain components may be omitted, and other components may be added.

Processor 902 may include any appropriate processor or processors. Further, processor 902 can include multiple cores for multi-thread or parallel processing. Processor 902 may be connected to other components through one or more bus or other electrical connections to send data to and receive data from the other components. Processor 902 may be implemented by using at least one hardware form of digital signal processing (DSP), a field-programmable gate array (FPGA), and a programmable logic array (PLA). Processor 902 may also include a main processor and a coprocessor. The main processor may be a central processing unit (CPU), and the coprocessor may be a graphics processing unit (GPU) configured to be responsible for rendering and drawing content that a display screen needs to display. Storage medium 904 may include memory modules, such as Read-only Memory (ROM), Random Access Memory (RAM), flash memory modules, and erasable and rewritable memory, and mass storages, such as CD-ROM, U-disk, and hard disk, etc. Storage medium 904 may store computer programs for implementing various processes, when executed by processor 902. Communication module 908 may include network devices for establishing connections through the communication link 240.

Peripherals 912 may include I/O devices such as a keyboard, a mouse, an audio input/out device to facilitate user interaction in the calibration, scanning, and/or reconstruction processes, such as designating light patterns, designating time interval for displaying the light patterns, designating rotation degree interval, acquiring initiation and stop signal for a current process, identifying image data to be used for reconstruction, etc. Peripherals 912 may also include connection ports compatible with components of the 3D object scanner 100. Database 910 may include one or more databases for storing certain data and for performing certain operations on the stored data, such as database searching. The data may include light patterns, images and corresponding attribute information obtained in the calibration and scanning process, geometry and material data obtained from the reconstruction process, algorithms directed to perform the calibration, scanning, and/or reconstruction processes, etc. Monitor 906 may be any suitable display technology suitable to display an image or video, a graphical user interface, etc. For example, monitor 906 may include a liquid crystal display (LCD) screen, an organic light-emitting diode (OLED) screen, or the like, and may be a touch screen.

The sequence numbers of the foregoing embodiments of the present disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of the present disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of the present disclosure.

In the foregoing embodiments of the present disclosure, descriptions of the embodiments have different emphases. As for parts that are not described in detail in one embodiment, reference can be made to the relevant descriptions of the other embodiments.

In the several embodiments provided in the present disclosure, it is to be understood that the disclosed client can be implemented in other manners. The apparatus embodiments described above are merely exemplary. For example, the division of the units is merely the division of logic functions and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of the present disclosure can be integrated into one processing unit, or each of the units can exist alone physically, or two or more units are integrated into one unit. The foregoing integrated unit can be implemented in the form of hardware or can be implemented in the form of a software function unit.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A three-dimensional (3D) object scanner, comprising:
an object platform configured to host a target object;
a projector device configured to project a first light pattern on to the target object;
an LED screen that surrounds the object platform and configured to emit a second light pattern;
an imaging device configured to obtain a plurality of images of the target object from multiple view angles as the target object and the imaging device are relatively rotated to multiple rotation degrees, the plurality of images including images obtained when the projector device projects the first light pattern and images obtained when the LED screen emits the second light pattern, wherein the images are used to determine 3D information and texture information of the target object,
wherein the projector device include a plurality of projectors configured to project one or more first light patterns on the target object from different directions; and
the plurality of projectors are fixedly disposed on the object platform, and configured to rotate with the object platform as the target object and the imaging device are relatively rotated to the multiple rotation degrees.

2. The 3D object scanner according to claim 1, wherein the LED screen includes a plurality of LED panels.

3. The 3D object scanner according to claim 2, wherein the plurality of LED panels have a same shape.

4. The 3D object scanner according to claim 1, wherein the LED screen has a dome shape or cube shape.

5. The 3D object scanner according to claim 4, wherein the LED screen is formed by a plurality of interconnected LED panels, the LED panels having a same shape with a same size.

6. The 3D object scanner according to claim 1, wherein the object platform is located at a center of a cross-sectional plane of the LED screen.

7. The 3D object scanner according to claim 1, wherein each projector is an elongated member that protrudes outward from an edge of the object platform.

8. The 3D object scanner according to claim 1, wherein the plurality of projectors are evenly distributed on a circumference of the object platform.

9. The 3D object scanner according to claim 1, wherein the imaging device is positioned inside an enclosure provided by the LED screen.

10. The 3D object scanner according to claim 1, wherein the imaging device is not positioned inside an enclosure provided by the LED screen, wherein a light path between the imaging device and the object platform pass through a part of the enclosure without obstruction.

11. The 3D object scanner according to claim 1, further comprising a frame configured to house the imaging device.

12. The 3D object scanner according to claim 11, wherein the frame includes an arc frame part, and the imaging device comprises a plurality of cameras evenly distributed on a span range of the arc frame part.

13. The 3D object scanner according to claim 12, wherein the plurality of cameras collectively span a total angle from 90 to 105 degrees.

14. The 3D object scanner according to claim 11, wherein the imaging device includes a camera, and the frame includes a movable structure configured to move the camera along a path and stop at multiple stopping positions on the path to obtain images of the target object from the multiple view angles, each stopping position corresponding to one of the multiple view angles.

15. The 3D object scanner according to claim 1, wherein the imaging device is fixed, and the object platform is configured to rotate based on the multiple rotation degrees.

16. A 3D object scanning method applied to a 3D object scanner, comprising:
 controlling a projector device of the 3D object scanner to project a first light pattern on to a target object, the target object being hosted by an object platform;
 controlling an LED screen of the 3D object scanner to emit a second light pattern, the LED screen surrounding the object platform; and
 controlling an imaging device of the 3D object scanner to obtain plurality of images of the target object from multiple view angles as the target object and the imaging device are relatively rotated to multiple rotation degrees,
 wherein the plurality of images include images obtained when the projector device projects the first light pattern and images obtained when the LED screen emits the second light pattern, and the images are used to determine 3D information and texture information of the target object,
 wherein the projector device include a plurality of projectors configured to project one or more first light patterns on the target object from different directions; and
 the plurality of projectors are fixedly disposed on the object platform, and configured to rotate with the object platform as the target object and the imaging device are relatively rotated to the multiple rotation degrees.

17. A non-transitory storage medium storing computer instructions that, when executed by a processor, causing the processor to perform:
 controlling a projector device of a 3D object scanner to project a first light pattern on to a target object, the target object being hosted by an object platform;
 controlling an LED screen of the 3D object scanner to emit a second light pattern, the LED screen surrounding the object platform; and
 controlling an imaging device of the 3D object scanner to obtain plurality of images of the target object from multiple view angles as the target object and the imaging device are relatively rotated to multiple rotation degrees,
 wherein the plurality of images include images obtained when the projector device projects the first light pattern and images obtained when the LED screen emits the second light pattern, and the images are used to determine 3D information and texture information of the target object,
 wherein the projector device include a plurality of projectors configured to project one or more first light patterns on the target object from different directions; and
 the plurality of projectors are fixedly disposed on the object platform, and configured to rotate with the object platform as the target object and the imaging device are relatively rotated to the multiple rotation degrees.

* * * * *